Patented Jan. 22, 1924.

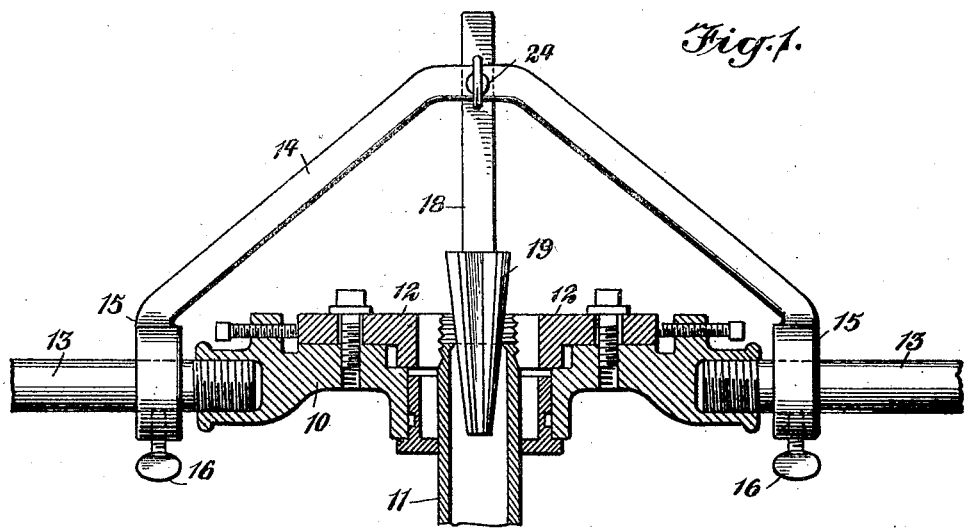
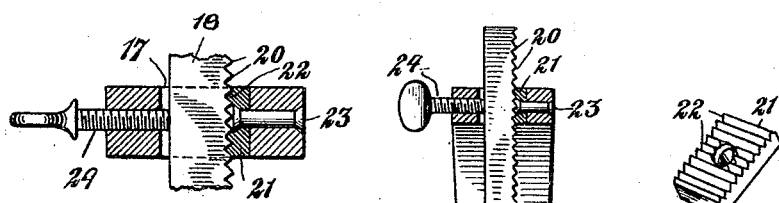
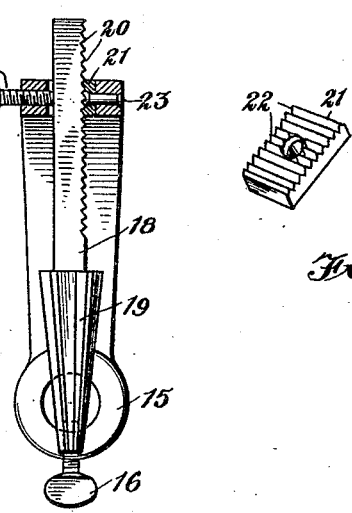

1,481,523

UNITED STATES PATENT OFFICE.

GEORGE A. MEIERS, OF NEW YORK, N. Y.

REAMER ATTACHMENT FOR DIESTOCKS.

Application filed January 24, 1922. Serial No. 531,321.

*To all whom it may concern:*

Be it known that I, GEORGE A. MEIERS, a citizen of the United States, and resident of New York, in the county of New York and State of New York, have invented certain new and useful Improvements in Reamer Attachments for Diestocks, of which the following is a specification.

This invention is a reamer for removing the inner bur from the end of a piece of pipe while the external threads are being cut thereon. It is of that type in which there is employed a yoke member adapted to be detachably secured to any ordinary type of hand-operated pipe threader or die-stock, and a reaming cutter adjustably secured to the yoke in alignment with the pipe and fed endwise and rotated with the thread cutting die.

In devices of this character the cutting action of the reamer on the pipe causes a reaction on the reamer tending to move it endwise in the yoke, and effect retardation of the reamer, that is, relative rotation of the yoke and reamer. Many devices of this general character have been designed, but none of them, so far as I am aware, satisfactorily resists the tendency of the reamer to slide or rotate, or both, in the yoke, and at the same time permit ease and accuracy of adjustment without the need of special tools.

In carrying out my invention I make the stem of the reamer polygonal in cross section to engage with a similar shaped hole in the yoke, so that relative rotation is positively prevented. One side or face of the reamer stem has formed thereon, and preferably integral therewith, a series of transverse ribs, ridges or teeth adapted to coact with a similarly formed face in the polygonal hole in the yoke. A set screw or equivalent adjusting device serves to force the stem laterally in its hole to engage the two sets of transverse teeth. The screw may be backed off to such an extent as to permit disengagement of the teeth and endwise movement of the reamer. It will be noted that even though the set screw is not tightened to the limiting extent and the stem is left slightly loose in the hole of the yoke, the stem cannot move endwise unless the looseness is such that the stem may move laterally to a distance equal to the height of a tooth. Thus, when the reamer is moved endwise to the desired position in accordance with the size of pipe to be reamed and the number of threads to be cut thereon, it may be clamped in place and both longitudinal and rotary movement relative to the yoke will be prevented by turning the set screw to only such an extent as can be readily done with the thumb and finger. Furthermore, the natural tendency of the stem to rotate in the hole forces the teeth adjacent to one corner of the stem into firm engagement with the opposing teeth in the hole. Furthermore, the distance between the teeth may be made substantially the same as the standard threads ordinarily cut on pipes from one-half an inch to one inch in diameter, and the teeth therefore facilitate the accurate positioning of the reamer in accordance with the diameter of the pipe and the number of threads to be cut thereon.

In the accompanying drawings I have illustrated one embodiment of my invention. In these drawings:

Fig. 1 is a central longitudinal section through a die-stock or pipe thread cutter with my improved attachment shown in side elevation.

Fig. 2 is a central section through the attachment,

Fig. 3 is a view similar to a portion of Fig. 2, but on a larger scale, and

Fig. 4 is a perspective view of the tooth member in the yoke hole.

I have illustrated my invention in connection with a pipe thread cutter or die-stock in which there is provided a head portion 10 adapted to receive the pipe 11 which is to be threaded by the action of dies 12 adjustably secured to the head. The head has oppositely disposed handle members 13 preferably in the form of detachable pipe sections, and by means of which the necessary force may be applied to rotate the head. The pipe threader or die stock illustrated forms no portion of my invention. It is shown merely for purposes of illustration and my improved device may be used either in the form illustrated or in modified form with a wide variety of pipe threaders.

My improved device as illustrated includes a yoke member 14 provided with terminal eyelet portions 15 which may be detachably secured to the die-stock or handles in any suitable manner. As illustrated the eyelet portions receive the handles 13 of the die-stock, and are locked rigid in respect thereto by means of ordinary set screws 16.

The yoke at its center portion has a polygonal aperture 17 therethrough for receiving the correspondingly shaped stem 18 of the reaming cutter 19. The stem may be made integral with the cutter, and the latter is preferably made of a comparatively sharp taper or angle, so that the amount of metal cut away during each revolution is comparatively small. The stem 18 and the hole 17 are shown as square in cross section, and the stem has a series of teeth 20 on one face thereof. Preferably, although not necessarily, these teeth are formed integral with the stem and are of approximately the shape, depth, and spacing of the teeth which are ordinarily cut on a gas pipe or the like. Within the hole 17 there is provided a plate 21 which has a similar set of teeth 22. This plate is secured in place in any suitable manner, as for instance by means of a rivet 23. The width of the hole in the direction of the teeth is substantially equal to the width of the stem, so that there is a close sliding fit. The hole is slightly larger than the thickness of the stem in a direction at right angles to the plane of the toothed member 21, so that the stem may move laterally in the hole and permit the two sets of teeth to engage or disengage. Due to the fact that endwise movement of the stem is prevented, even though the two sets of teeth overlap to only a portion of their respective depths, it is clear that the use of any great degree of force in tightening the set screw 24 is not necessary. The set screw may be tightened to only such an extent as may be easily done with the thumb and finger, and therefore may be easily loosened when adjustment of the reamer is necessary.

Having thus described my invention, what I claim as new and desire to secure by Letters Patent is:—

1. The combination with a pipe threading die-stock, of a yoke detachably secured thereto and having a polygonal hole therethrough in alignment with the die-stock, a reamer having a stem of cross-sectional form corresponding to that of said hole, said stem and one wall of said hole having coacting transversely extending teeth of a spacing substantially equal to the spacing of the threads to be cut by the die, and means for holding the stem with its teeth in locking engagement with those of the hole, and in endwise adjusted position in accordance with the number of threads to be cut, said hole being slightly larger than said stem, whereby upon release of said last mentioned means said stem may be moved freely through said hole.

2. A reamer attachment for die-stocks, including a yoke having end portions adapted to be detachably secured to the die-stock and having a central portion provided with a polygonal hole therethrough, a face plate rigidly secured within said hole and presenting a series of teeth, a reamer having a stem of a shape corresponding to that of the hole and provided with a series of teeth for engagement with those of said plate, and a set screw for forcing the stem toward said plate, said hole being of such size in respect to said stem as to permit endwise movement of the stem through the hole upon the disengagement of the set screw from the stem.

Signed at New York, in the county of New York and State of New York, this 21st day of January, A. D. 1922.

GEORGE A. MEIERS.